Figure 1:
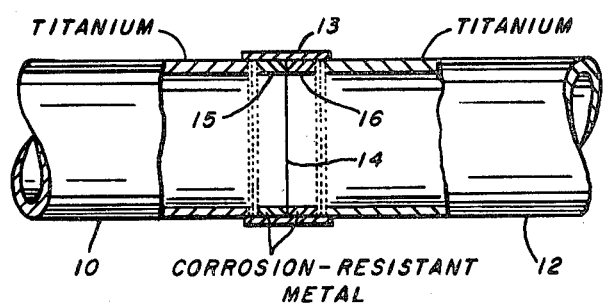

United States Patent [19]
Bomberger, Jr.

[11] 3,919,761
[45] Nov. 18, 1975

[54] METHOD OF HANDLING CORROSIVE SUBSTANCES
[75] Inventor: Howard B. Bomberger, Jr., Canfield, Ohio
[73] Assignee: RMI Company, Niles, Ohio
[22] Filed: Apr. 22, 1974
[21] Appl. No.: 462,848

Related U.S. Application Data
[60] Division of Ser. No. 302,467, Oct. 31, 1972, Pat. No. 3,876,136, which is a continuation-in-part of Ser. No. 152,771, June 14, 1971, abandoned.

[52] U.S. Cl. .................... 29/428; 285/173; 29/460; 228/140
[51] Int. Cl.² ...................... F16L 13/02; F16L 58/00
[58] Field of Search ........... 29/471.1, 494; 285/286, 285/173, 329, 363, 378

[56] References Cited
UNITED STATES PATENTS
| 947,130 | 1/1910 | Rogers | 285/363 X |
| 2,077,035 | 4/1937 | Bredeson | 285/363 |
| 2,157,357 | 5/1939 | Straty | 285/363 X |
| 2,555,256 | 5/1951 | Tyson | 29/471.1 |
| 2,985,747 | 5/1961 | Kutchera | 29/471.1 |
| 3,070,881 | 1/1963 | Brooks | 29/471.1 |
| 3,107,421 | 10/1963 | Turnbull | 29/471.1 |
| 3,359,626 | 12/1967 | Auld | 29/471.1 |
| 3,467,410 | 9/1969 | Chandler | 285/286 X |
| 3,632,143 | 1/1972 | Lessman | 285/363 X |

Primary Examiner—Al Lawrence Smith
Assistant Examiner—Robert C. Watson
Attorney, Agent, or Firm—Walter P. Wood

[57] ABSTRACT

A method of handling corrosive substances and a titanium article for handling such substances. Titanium resists corrosion well, but is susceptible to attack by certain solutions at restricted crevices, as are formed where one piece of an article abuts another piece. Inserts of a metal which is compatible with titanium, but is more resistant to corrosion than titanium, are welded to the faces of each titanium piece where the piece confronts another piece. Restricted crevices are confined to the inserts.

6 Claims, 2 Drawing Figures

METHOD OF HANDLING CORROSIVE SUBSTANCES

This application is a division of my earlier application Ser. No. 302,467, filed Oct. 31, 1972, now U.S. Pat. No. 3,876,136, which in turn is a continuation-in-part of my earlier application Ser. No. 152,771, filed June 14, 1971 (now abandoned).

As used herein without further qualification, the term "titanium" includes the various titanium-base alloys, as well as unalloyed titanium. For most purposes, titanium has excellent resistance to corrosion, and hence may be used to advantage in articles in which corrosivee substances are handled. However, titanium articles tend to corrode at deep restricted crevices when exposed to certain highly corrosive substances, such as hot chlorinated brine or wet chlorine gas. Smooth surface areas and open crevices of the article successfully resist corrosion, which is confined to the more restricted crevices unavoidable in many articles. A typical restricted crevice is the crevice formed between two flat abutting faces, such as that formed where the end face of one section of a conduit abuts the end face of the next section. A typical open crevice, which is not a problem, is the crevice formed between two surfaces meeting at right or obtuse angles.

An object of my invention is to provide an improved method and titanium article in which corrosive substances can be handled without causing corrosion at restricted crevices.

A more specific object is to provide a method and plural-piece titanium article which accomplishes the foregoing object and in which the crevices are confined to inserts welded to the faces of the titanium pieces where each piece confronts another piece, said inserts being of a metal compatible with titanium, but more corrosion-resistant than titanium.

Figure 2:
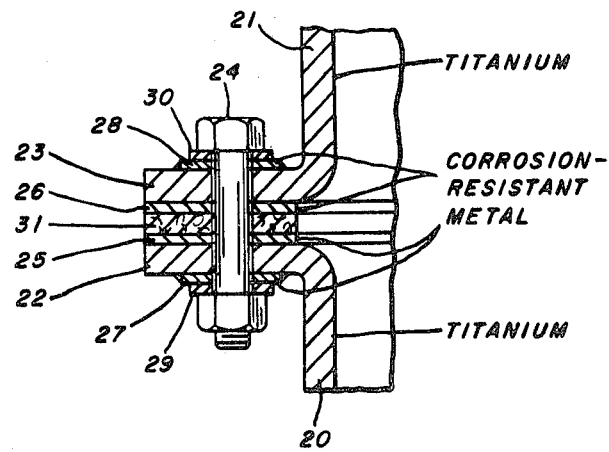

In the drawing:

FIG. 1 is a sectional view of a duct constructed in accordance with my invention; and FIG. 2 is a sectional view of a portion of a vessel wall also constructed in accordance with my invention.

FIG. 1 shows a titanium duct formed of two pieces 10 and 12 abutting end-to-end. The pieces are joined with a tape 13 which extends around their outside circumference. There is a restricted crevice 14 under the tape where the flat end surfaces of two pieces abut. When the duct is used for handling certain corrosive substances, such as hot chlorinated brine or wet chlorine gas, in the absence of the present invention, corrosion tends to take place at this crevice, but the remainder of the duct successfully resists corrosion.

In accordance with my invention, I weld inserts 15 and 16 to the confronting end faces of the two pieces 10 and 12, forming smooth welds which do not themselves create crevices. The inserts are of a metal which is compatible with titanium, but is more corrosion-resistant than titanium with respect to the substance handled in the duct. One preferred choice of metals for the inserts is tantalum, but other choices are zirconium and columbium, molybdenum and vanadium and alloys of these metals. Another preferred choice is a more corrosion-resistant titanium-base alloy, outstanding among which are the titanium-nickel alloy containing up to about 5 percent by weight nickel, and the titanium-cobalt alloy containing about 0.3 to 5 percent by weight cobalt, as claimed in U.S. Pat. No. Re. 27,286. Also the titanium-molybdenum alloy described both in the same patent and in U.S. Pat. No. 3,370,946 may be used.

FIG. 2 shows a portion of a titanium vessel wall formed of pieces 20 and 21. The two pieces have mating abutting flanges 22 and 23 which are joined with a titanium bolt 24. In accordance with my invention, I weld inserts 25 and 26 of a compatible more corrosion-resistant metal to the confronting faces of flanges 22 and 23, respectively. The available choices of more corrosion-resistant metal are similar to those in the first embodiment. If the flanged side of the pieces is exposed to the corrosive substance, I also weld facing pieces 27 and 28 of similar corrosion-resistant metal to the outside faces of flanges 22 and 23, and preferably apply washers 29 and 30 of similar material over the facing pieces where the bolt 24 extends through the flanges. I insert a gasket 31 between the two inserts 25 and 26. It should be noted that the edges of the inserts 25 and 26 meet the surfaces of the titanium pieces 20 and 21 approximately at right angles. Titanium does not corrode at the resulting open crevices between the inserts and pieces.

I define "metal compatible with titanium" as a metal which has the characteristics that it can be welded to titanium without forming brittle intermetallic welds, and equally important that it does not form a galvanic couple with titanium in the presence of an electrolyte. When two different metals are in contact with each other and are exposed to an electrolyte, the metals usually form a galvanic couple. As a result, the less noble of the two metals corrodes rapidly. The compatible metals useful as inserts in the present invention differ only slightly in their electrochemical potential from titanium, and titanium undergoes polarization to approach the potential of the insert; that is, any galvanic action which may take place initially quickly develops a high-ohmic-resistance film on the less noble titanium. This film stops any further galvanic action. I believe it is altogether unexpected and surprising that I am able to bring two different metals together in this fashion without actually worsening the corrosion problem. In the prior art, it has been considered necessary to line any vessel in which two metals are exposed to an electrolyte with a non-metallic material. For example, a pipe in which ordinary steel and stainless steel are exposed to salt water may be lined with concrete. When my invention is used, no lining is needed and both metals may be exposed directly to the electrolyte.

In both the duct of FIG. 1 and the vessel of FIG. 2, restricted crevices are confined to the more corrosion-resistant inserts 15, 16 or 25, 26. Thus my invention effectively prevents corrosion at such crevices, even though the substance handled may induce corrosion at restricted crevices in titanium itself, and my invention forestalls any galvanic action which would worsen the corrosion problem. The metal of which the insert is formed usually is more costly than titanium. Hence my invention produces a substantial cost saving by confining use of the more costly material to locations where it is actually needed.

I claim:

1. A method of handling a substance in a titanium article formed of more than one piece, which substance corrodes titanium at restricted crevices but to which titanium is otherwise corrosion-resistant, said method comprising:

welding inserts to the ends of each titanium piece where the piece is to confront another piece in the article and form a restricted crevice;

said inserts being of a metal which is compatible with titanium but is more resistant to corrosion than titanium and which avoids formation of a galvanic couple with titanium in the presence of said substance;

assembling said pieces to form said article with said inserts abutting and with restricted crevices confined to said inserts;

introducing said substance to said article; and developing a high-ohmic-resistance film on the titanium by polarization.

2. A method as defined in claim 1 in which said inserts are of a metal of the group consisting of tantalum, zirconium, columbium, molybdenum, vanadium and alloys thereof, and highly corrosion-resistant titanium-base alloys.

3. A method as defined in claim 2 in which the inserts are of tantalum.

4. A method as defined in claim 2 in which said inserts are of a titanium-nickel alloy containing up to about 5 percent by weight of nickel.

5. A method as defined in claim 2 in which said inserts are of a titanium-cobalt alloy containing about 0.3 to 5 percent by weight cobalt.

6. A method as defined in claim 1 in which said substance is of the group consisting of hot chlorinated brine and wet chlorine gas.

* * * * *